United States Patent [19]

Lee

[11] Patent Number: 5,050,153
[45] Date of Patent: Sep. 17, 1991

[54] SEMICONDUCTOR LASER OPTICAL HEAD ASSEMBLY

[75] Inventor: Wai-Hon Lee, 10332 Noel Ave., Cupertino, Calif. 95014

[73] Assignee: Wai-Hon Lee, Sunnyvale, Calif.

[21] Appl. No.: 362,124

[22] Filed: Jun. 6, 1989

[51] Int. Cl.$^5$ .............................. G11B 7/12
[52] U.S. Cl. ........................ 369/112; 369/44.11; 369/44.13
[58] Field of Search ............ 369/122, 103, 112, 44.12, 369/44.23, 44.11; 350/7.2, 7.32, 3.72

[56] References Cited

U.S. PATENT DOCUMENTS

4,355,858 10/1982 Funato et al. ..................... 350/3.72
4,794,585 12/1988 Lee ...................................... 369/112

Primary Examiner—Roy N. Envall, Jr.
Assistant Examiner—Hindi Nabil
Attorney, Agent, or Firm—Townsend and Townsend

[57] ABSTRACT

An improved optical head for reading information recorded on a reflected medium. The optical head uses a hologram lens assembly having a transparent plate and a hologram lens, the transparent plate being obliquely positioned relative to a forward and a return beam paths. The transparent plate corrects beam aberrations in a laser beam emitted by a semiconductor laser on the forward beam path. The hologram lens diffracts the laser beam on the return beam path onto a photodetector. Both the transparent plate and the hologram lens add beam aberrations to the defracted laser beam on the return beam path for tracking purposes. The hologram lens assembly may also include a second hologram lens, preferably a three beam diffraction grating, for tracking purposes. The hologram lens and the diffraction grating may be located on the obliquely positioned transparent plate or on other transparent plates.

22 Claims, 8 Drawing Sheets

SEMICONDUCTOR LASER OPTICAL HEAD ASSEMBLY

FIELD OF THE INVENTION

The present invention relates to optical heads for use in data recording and retrieval systems.

BACKGROUND OF THE INVENTION

Optical heads produce a focused beam or light on a medium containing information and detect the light reflected from the medium to determine the information content of the medium. Mechanisms for maintaining the focus and tracking of the optical head are required. With the recent advances in semiconductor lasers, there has been an increasing use of these lasers in data retrieval and recording systems. The compact audio disc player is a significant example of how lasers are used in playing back prerecorded music, which is a form of information. The concept of the compact audio disc player can be applied to the storage of data for a large computer network, mini computers or even personal computers.

When lasers are employed in these devices, the light emitted by the lasers must be controlled by appropriate optical components to produce a very small spot of light on the medium surface. Light reflected off of the medium is projected back to a detector from which recorded information and other signals relating to the status of the focus and tracking can be derived. Some examples of patents covering optical systems for such applications are U.S. Pat. Nos. 3,962,720, 3,969,573, 4,034,403, 4,057,833, 4,135,083, 4,143,402, 4,193,091, 4,198,657, 4,458,980, 4,486,791, 4,779,943, and West German Pat. No. 2501124.

Figure 1:
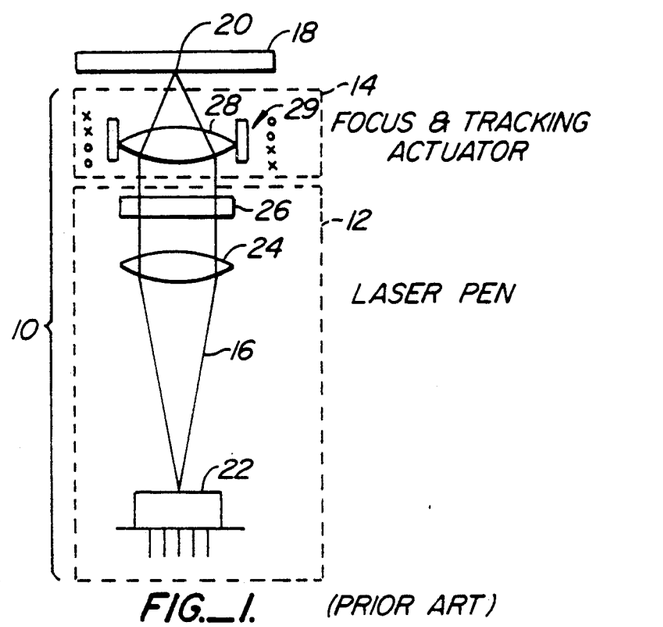
FIG. 1 is a diagram of a prior art single beam optical head.

FIG. 1 shows a prior art optical head from U.S. Pat. No. 4,731,772 that uses a hologram lens for both beam splitting and focus detection functions. An optical head 10 consists of a laser pen 12 and a focusing and tracking actuator 14. A laser beam 16 is focused on a grooved information medium 18 at a spot 20. Laser pen 12 consists of a semiconductor laser and detector 22, a collimating lens 24, and a hologram lens 26. The focus and tracking actuator consists of an objective lens 28 that can be moved up and down by a magnetic coil 29 for focusing the laser beam.

Figure 2:
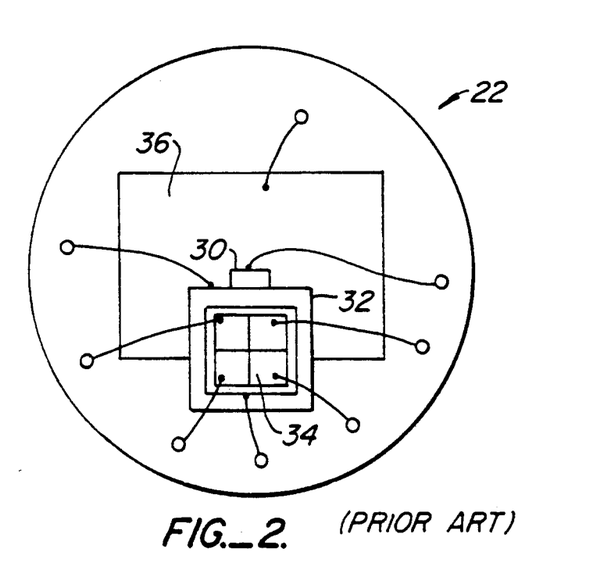
FIG. 2 is a front view of the prior art semiconductor laser and detector device shown in FIG. 1.

FIG. 2 shows a front view of the semiconductor laser and photodetector 22. A semiconductor laser 30 is mounted on a heatsink 32. A four quadrant photodetector 34 is mounted on the face of heatsink 32. A photodetector 36 is located behind semiconductor laser 30 to measure the light emitted from the semiconductor laser. Photodetector 36 is at an angle so that it does not reflect light back into the semiconductor laser. In operation, laser beam 16 is emitted by semiconductor laser 30 and is collimated or made parallel by collimating lens 24. This collimated beam passes through hologram lens 26 to produce a zero order diffracted beam and a number of higher order diffracted beams. The zero order diffracted beam continues on the same path, not at an angle, and is the only beam used in the forward light path of the optical head. This beam is focused on medium 18 by objective lens 28 which can be moved with magnetic coil 29.

On the return path, the reflected laser beam again hits holograms lens 26 producing zero and higher order diffracted beams. The zero order beam returns to the semiconductor laser and is not used for detection. One of the higher order beams, generally the first order beam, is imaged onto the photodetector by the combination of hologram lens 26 and collimating lens 24. The hologram lens not only diffracts the returned beam toward the four-quadrant detector 34, but also acts like a cylindrical lens to produce a focusing and tracking pattern on four-quadrant photodetector 34 which varies according to the focus and tracking of spot 20.

Figure 3A:
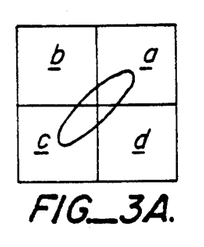
FIGS. 3A-C are diagrams focusing and tracking patterns for the prior art single beam optical head shown in FIG. 1.
Figure 3B:
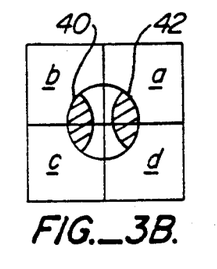
Figure 3C:
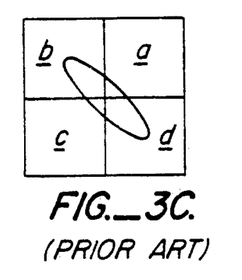

Examples of the focusing pattern on four quadrant detector 34 are shown in FIGS. 3A–3C, with the best being shown in FIG. 3B. A focus error signal is produced by $(A+C)-(B+D)$. FIG. 3A shows the focusing pattern when the beam is out of focus because the medium is too close to the objective lens. FIG. 3C shows the focusing pattern when the beam is out of focus due to the medium being too far from the objective lens. FIG. 3B shows the focusing pattern (called the circle of least confusion) when the beam is in focus.

FIG. 3B also shows overlapping beams 40 and 42 which are produced by the grating effect of the grooved structure of medium 18. A tracking signal or tracking push-pull signal is given by $(A+D)-(B+C)$. The beam will be on track and the tracking signal will be equal to zero when beams 40 and 42 are of equal brightness. One of the disadvantages of the push-pull tracking error signal is that it can be affected by large motion of the objective lens relative to the collimating lens. One method to avoid this difficulty is to have the complete optical head follow the motion of the focus and tracking actuator.

FIGS. 1–3 show an optical head using a holographic lens for both beam splitting and focus error detection. In that system the focus error and the tracking error are derived from the same four segment detectors. Because all the information related to the data signal and servo signals is derived from a single beam focused on the information medium, this type of optical head is often called a single beam optical head. A more popular optical head used in many commercial products is called a three beam optical head which derives the necessary information by focusing three laser beams onto the information medium.

Figure 4:
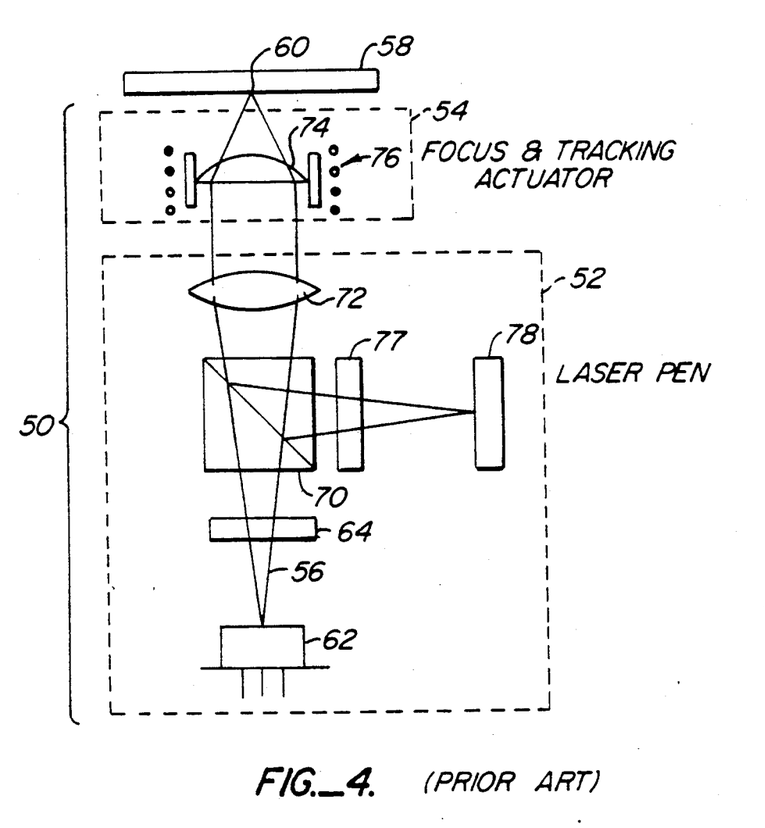
FIG. 4 is a diagram of a prior art three beam optical head.
Figure 5:
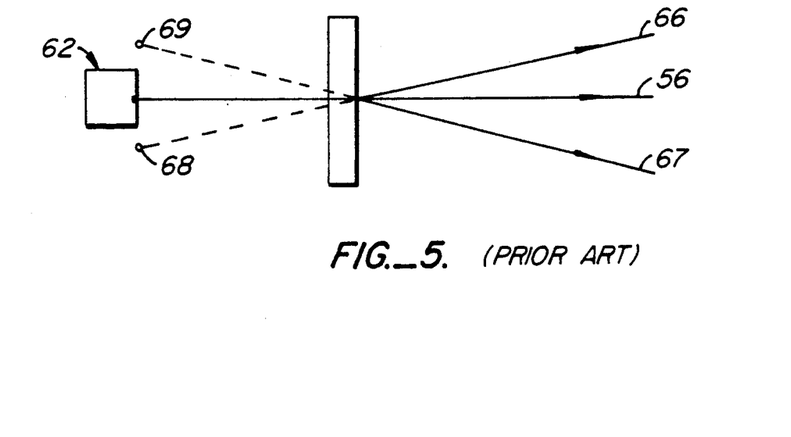
FIG. 5 is a diagram illustrating the creation of the three beams by a diffraction grating for the prior art optical head shown in FIG. 4.

FIG. 4 shows one embodiment of a prior art three beam optical head 50. The optical head consists of a laser pen 52 and a focusing and tracking actuator 54. A laser beam 56 is focused on an information medium 58 at a spot 60. Laser beam 56 is emitted from a semiconductor laser 62 in the shape of an elliptical cone. It is known to correct some aberrations in the laser beam such as astigmatism by placing a tilted glass cap onto the front surface of the semiconductor laser. Laser beam 56 first passes through a grating 64 which diffracts the laser beam into three beams 56, 66, and 67 as shown in FIG. 5. Of course, each of the laser beams originates from semiconductor laser 62. However, the diffracted beams 66 and 67 appear to originate from virtual laser sources 68 and 69, respectively. The angle of separation between each of the diffracted beams and the incident beam is small. For the sake of simplicity in this discussion, the beam indicated as 56 is assumed to include the two diffracted beams 66 and 67. Beam 56 passes unchanged through a beam splitter 70 to a collimating lens 72. The beam is collimated or made substantially parallel by the collimating lens. The parallel beam then impinges upon an objective lens 74 which focuses beam 56 onto medium 58 at spot 60. The focusing of lens 74 is accomplished through the use of a magnetic coil 76 which moves objective lens 74 up and down with respect to the medium 58. In addition a tracking coil may move objective lens 74 horizontally. The three beams are reflected off reflective medium 58 through a beam splitter 70. Part of each of the three beams are reflected by the beam-splitter, pass through a cylindrical lens 77 to a six segment photodetector 78.

Figure 6A:
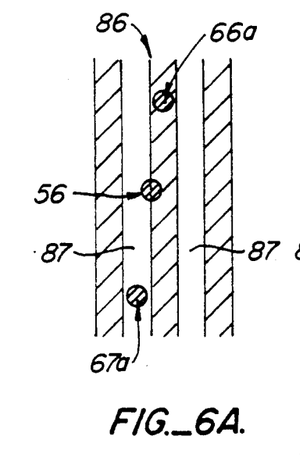
FIGS. 6A-C is a diagram illustrating the position of the three beams on the medium for the prior art optical head shown in FIG. 4.
Figure 6B:
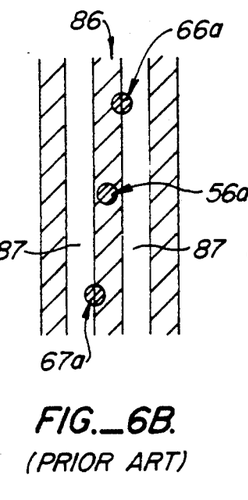
Figure 6C:
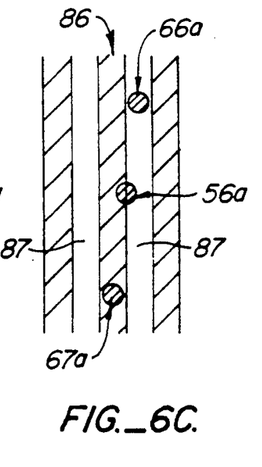

The three beams focused on the medium are shown in FIGS. 6A, 6B, and 6C in three different positions 56a, 66a and 67a (corresponding to beams 56, 66 and 67) with respect to a data track 86 between land areas 87. FIG. 6A shows center spot 56a, which reads the information from the medium, off to the left of track 86. In this case side spot 66a is on data track 86 and side spot 67a is on land area 87. The tracks have lower reflectivity than the land areas. As a result the beam reflected from side spot 66a has a lower intensity than the beam reflected from side spot 67a. In FIG. 6B, center spot 56a is exactly on track. Side spots 66a and 67a symmetrically straddle the data track and the land areas. The beams reflected from side spots 66a and 67a have the same intensity. FIG. 6C shows center spot 56a to the right of the data track. In this case the beam reflected from side spot 66a has greater intensity than the beam reflected from side spot 67a. The difference between the amount of light reflected from the two side spots produces the tracking error signal.

Figure 7:
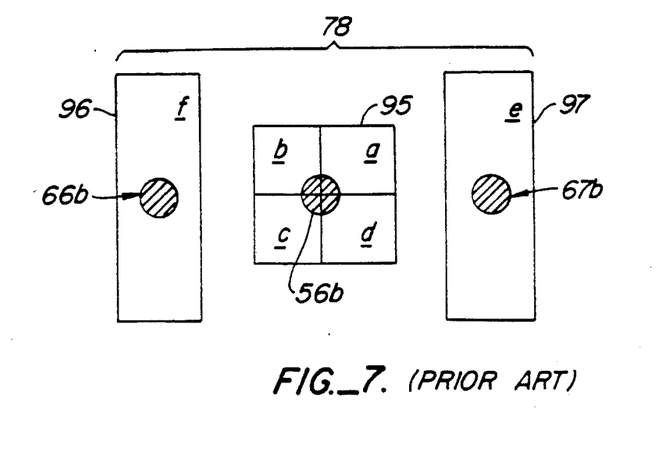
FIG. 7 is a diagram of the six segment photodetector used by the prior art optical head shown in FIG. 4.

FIG. 7 shows the three beams imaged at spots 56b, 66b, and 67b on six segment photodetector 78 as described in FIG. 4 above. Middle beam 56 of the three beams is imaged at center spot 56b on quadrant detector 95. Side beams 66 and 67 are imaged at side spots 66b and 67b on photodetectors 96 and 97, respectively. The quadrant detector is used for focusing as described in FIGS. 3A-C above. However, photodetectors 96 and 97 are used for tracking by detecting the difference between the intensities of beams 66 and 67 as described with reference to FIGS. 6A-6C above. This provides for greater sensitivity of tracking than single beam optical heads.

SUMMARY OF THE INVENTION

The present invention is an improved optical head for reading information recorded on a reflected medium. The optical head uses a hologram lens assembly having a transparent plate and a hologram lens, the transparent plate being obliquely positioned relative to a forward and a return beam paths. The transparent plate corrects beam aberrations in a laser beam emitted by a semiconductor laser on the forward beam path. The hologram lens diffracts the laser beam on the return beam path onto a photodetector. Both the transparent plate and the hologram lens add beam aberrations to the diffracted laser beam on the return beam path for tracking purposes. The hologram lens assembly may also include a second hologram lens, preferably a three beam diffraction grating, for tracking purposes. The hologram lens and the diffraction grating may be located on the obliquely positioned transparent plate or on other transparent plates.

In the preferred embodiment a semiconductor laser is provided which produces a laser beam which impinges upon a movable objective lens. The objective lens focuses the laser beam onto a reflective information medium. A transparent plate with a diffraction grating structure recorded on a first surface and a hologram lens recorded on a second surface is placed between the laser and the objective lens. The laser beam is diffracted into three dominant beams by the diffraction grating on the first surface. These three beams then pass through the transparent glass plate and the hologram lens on the second surface, thereby correcting beam aberrations such as astigmatism, and further diffracting the three beams into several groups of three beams. However, only the primary group of beams are used in the forward path from laser to the objective lens. On the return path, one of the groups of three beams diffracted by the hologram lens on the second surface bypasses the diffraction grating on the first surface and is focused on an eight segment detector. Furthermore, the hologram lens and the transparent glass plate add aberrations to the beams, thereby providing a means for detecting focus and tracking errors.

The present invention thus provides a simple one or three beam tracking optical head with less parts than the prior art. The present invention is also less susceptible to error due to vibration than the prior art optical heads. A holograph lens assembly with a transparent plate, a diffraction grating, and a hologram lens performs the functions of a astigmatic correction lens, a diffraction grating, a beamsplitter, a condensing lens with aberration correction, and a cylindrical lens.

For a fuller understanding of the nature and advantages of the invention, reference should be made to the ensuing detailed description taken in conjunction with the accompanying drawings.

BRIEF DESCRIPTION OF THE DRAWINGS

FIGS. 14 A-C is a diagram illustrating a differential method for extracting the focus and tracking error signal from the photodetector;

DETAILED DESCRIPTION OF THE PREFERRED EMBODIMENTS

Figure 8:
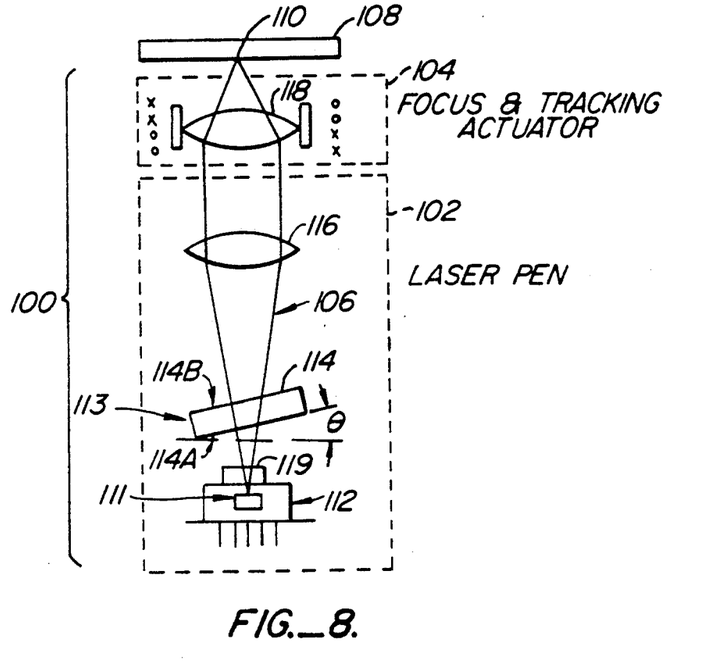
FIG. 8 is a diagram of the preferred embodiment of the present invention.

A first embodiment of an optical head 100 according to the present invention is shown in FIG. 8. The optical head consists of a laser pen 102 and a focusing and tracking actuator 104. A laser beam 106 is focused on an information medium 108 at spot 110. A semiconductor laser 111 of a semiconductor laser and photodetector assembly 112 radiates laser beam 106 to a holographic lens assembly 113. The holographic lens assembly has an oblique transparent plate 114 with a hologram lens, preferably a diffraction grating, on a first surface 114A and a hologram lens on a second surface 114B. The beams emerging from the holographic lens assembly collimated by a collimating lens 116 and then focused by objective lens 118 onto medium 108 at spot 110. The beams then reflect off medium back through objective lens 118, collimating lens 116, and holographic lens assembly 113. The hologram lens on second surface 114B causes diffracted beams to image on photodetector 119.

Figure 9:
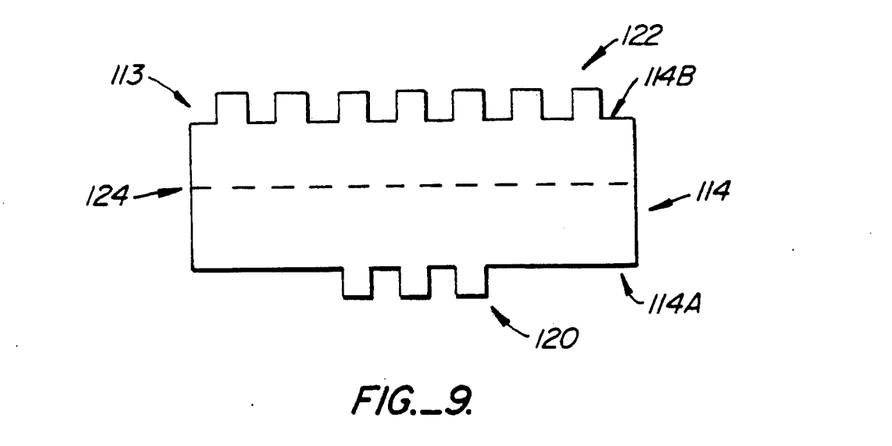
FIG. 9 is a top view of the glass plate used in the preferred embodiment of the present invention with a diffraction grating structure on a first surface and a hologram lens structure on a second surface.

FIG. 9 is a side view of holographic plate 114. The transparent plate 114 is preferably glass with a hologram lens structure, preferably a grating structure 120, embossed or etched on a first surface 114A and a hologram lens structure 122 embossed or etched on a second surface 114B. Grating structure 120 is a diffraction grating with a smaller width than the hologram lens structure 122. The thickness of the glass and the separation between the first and second surfaces are selected so that the diffracted beam on the return path will miss grating structure 120. This separation between the first and second surfaces is preferably greater than 3 millimeters. The holographic lens assembly can be fabricated by cementing two glass plates together as shown by bond line 124. The holographic lens assembly is preferably placed about 4 millimeters away from the semiconductor laser.

Figure 10:
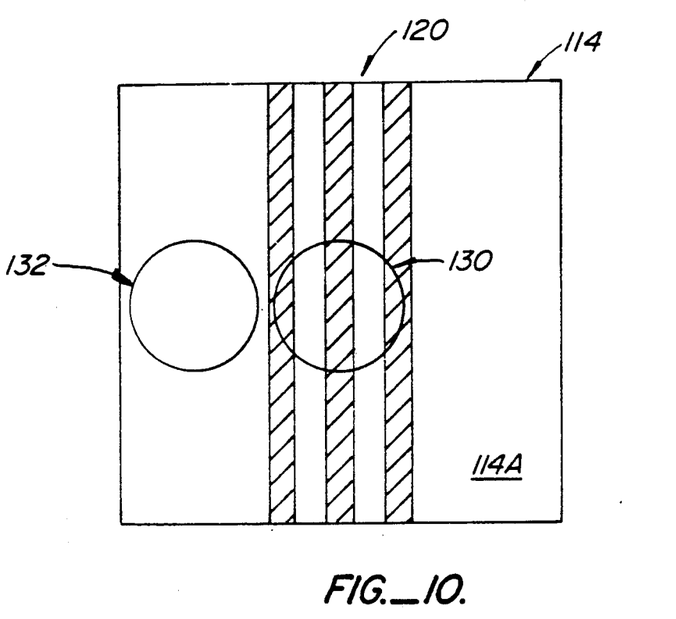
FIG. 10 is a side view of the glass plate showed in FIG. 9.

FIG. 10 is a front view of glass plate first surface 114A showing a preferred structure 120. The location of laser beam 106 is shown as a forward laser beam 130 and a return diffracted laser beam 132. The return beam bypasses grating structure 120 and is imaged on photodetector 119 shown in FIG. 8.

Figure 11:
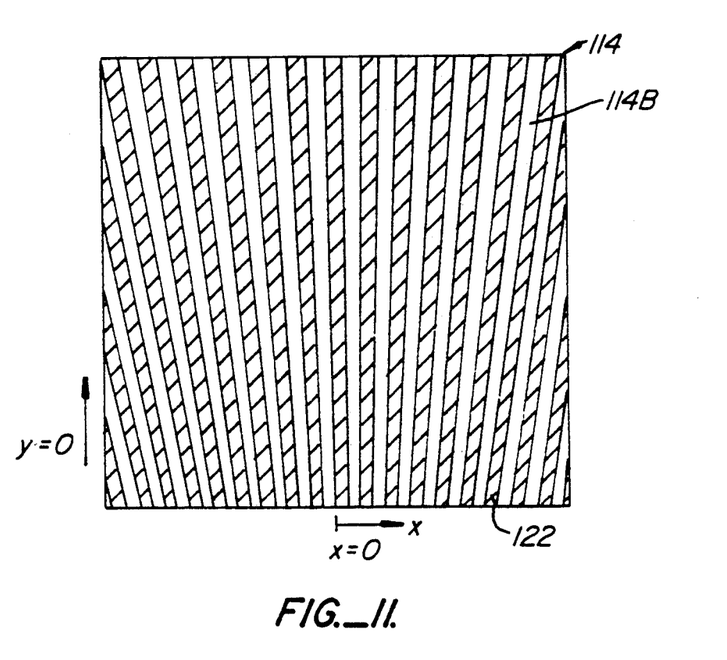
FIG. 11 is a side view of the preferred hologram lens structure showed in FIG. 9.

FIG. 11 is a front view of glass plate second surface 114B showing a preferred hologram lens structure 122. The fringes of the hologram lens structure are either parallel or perpendicular to the fringe direction of the grating structure depending on the orientation of photodetector 119 to holographic lens assembly 113.

Figure 12:
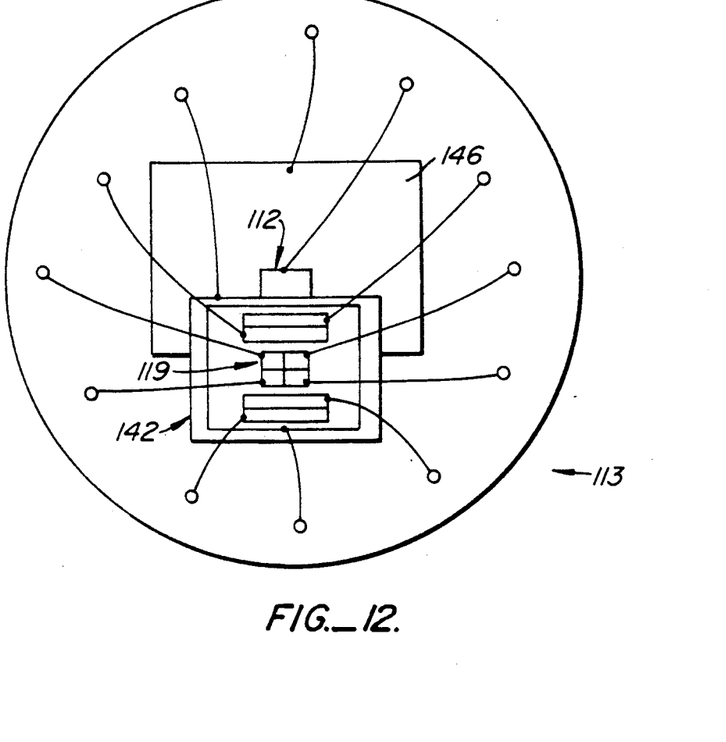
FIG. 12 is a diagram illustrating the semiconductor and photodetector device shown in FIG. 8.

FIG. 12 is a front view of the semiconductor laser and photodetector assembly 113 shown in FIG. 8. Semiconductor laser 112 is mounted on a heat sink 142. Eight segment photodetector 119 is preferably mounted below the semiconductor laser. The center of the eight segment photodetector is preferably separated from the emitting surface of the semiconductor laser by less than 5 millimeters. A rear facet photodetector 146 is mounted behind and preferably tilted with respect to the semiconductor laser.

Figure 13:
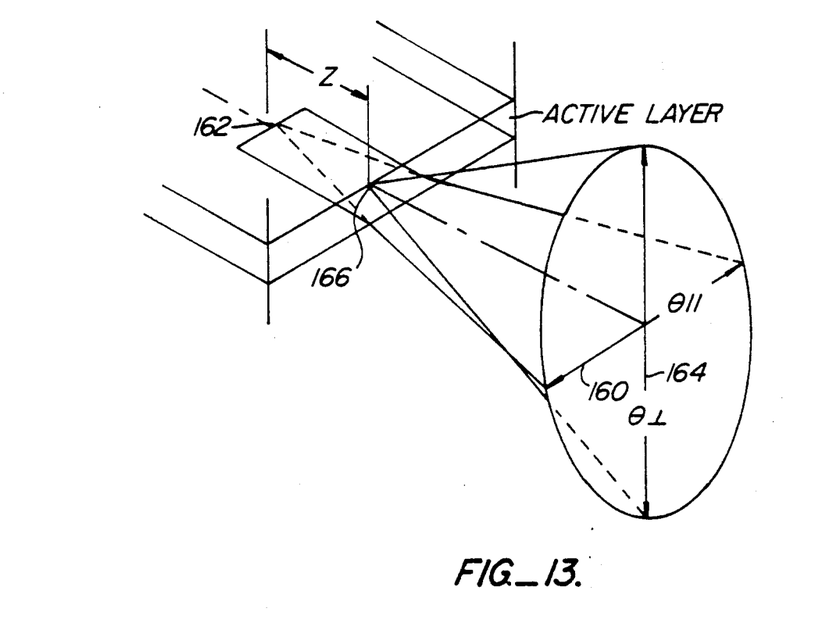
FIG. 13 is a diagram illustrating the source of astigmatism inherent in a laser beam emitted by a semiconductor laser.

As shown in FIG. 13, most semiconductor lasers have laser light emitting from two planes that are perpendicular to the laser beam direction. In the preferred embodiment, the semiconductor laser has a p-n junction parallel to the surface of the heat sink and perpendicular to the surface of the eight segment photodetector. Light emitting from a plane parallel to the laser junction 160 ($\theta \parallel$) comes from a plane on the back surface of the semiconductor laser 162. Light emitting from a plane perpendicular to the laser junction 164 ($\theta \perp$) comes from a plane on the front surface of the semiconductor laser 166. The astigmatic distance (Z) of the semiconductor laser is the distance separating the two planes.

The astigmatism of the laser beam can be corrected by the tilt of glass plate 114 with respect to the beam path. If the thickness of the glass plate is D, then the tilt angle needed to correct the astigmatism of the laser is approximately given by $$\cos \theta = (n_g - n_{air})D/[n_g(Z+D) - n_{air}D],$$

where $n_{air}$ and $n_g$ are the refractive index of air and glass respectively. For example, if $Z = 0.02$ mm, $D = 3$ mm, $n_g = 1.5$ and $n_{air} = 1$, the angle $\theta$ is calculated to be 11 degrees. For a semiconductor laser with an astigmatic distance $Z = 0.005$ mm, the angle is reduced to 5 degrees.

In addition to the correction of the astigmatism inherent in the laser beam, the grating structure on the first surface of the glass plate diffracts the incident beam into three beams. The beams continue to pass through hologram lens structure on the second surface of the glass plate. However, only the zero order diffracted beams from the hologram lens structure are used in the forward path to the information medium. Therefore, it is desirable to reduce the intensity of the remaining beams in order to reduce ambient noise. Preferably, the other diffracted beams from the hologram lens are obstructed by the aperture of collimating lens 116 and the aperture of objective lens 118, thereby diminishing their intensity. Furthermore, the holographic lens preferably causes all but the zero order beams to be astigmatic, thereby further decreasing their intensity. The three beams focused on the medium have the same appearance as the beams illustrated in FIG. 3.

On the return path, the three return beams again pass through the hologram lens producing zero and higher order diffracted beams. The zero order beam is astigmatized by the tilted glass plate and diffracted by the grating structure on the first surface and returns to the laser diode. As a result, its intensity is reduced to prevent interference with the operation of the laser diode. One of the higher order diffracted beams, preferably the first order beam from the hologram lens structure, is astigmatized by the hologram lens structure, the tilted glass plate, and bypassing the grating structure as shown in FIG. 10. The diffracted astigmatized beam is then imaged onto the eight segment photodetector.

Figure 14A:
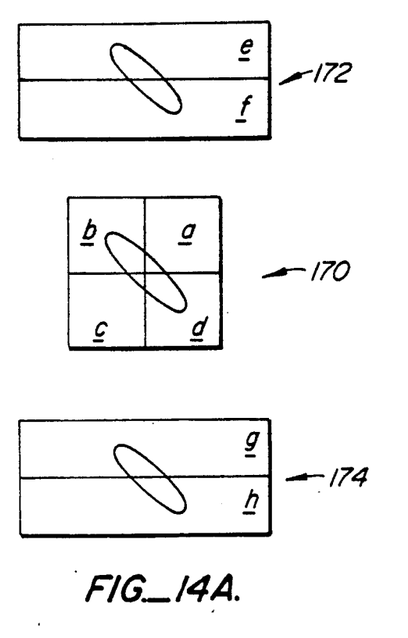
Figure 14B:
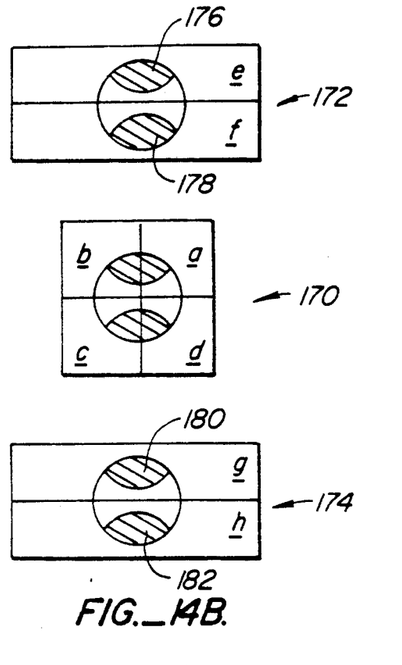
Figure 14C:
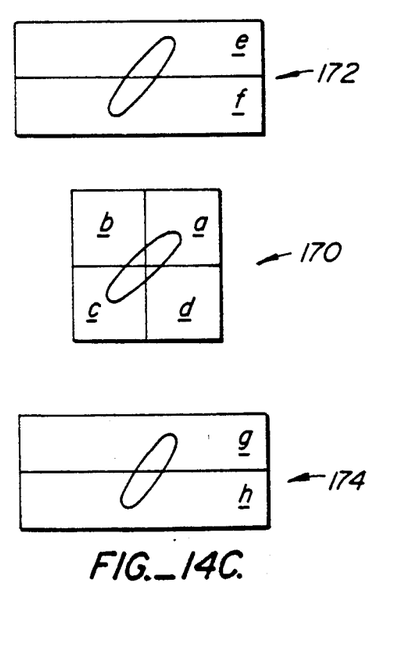

The beams imaged on the eight segment photodetector vary according to the focus and tracking of the beam on the medium. This is illustrated in FIGS. 14A-C. The middle beam of the three beams is imaged to a quadrant detector 170. The two side beams are imaged onto split detectors 172 and 174. FIG. 14B shows the beams in its best focus. FIG. 14A shows the beams out of focus when the medium is too close to the lens and FIG. 14C show the beam out of focus when the medium is too far from the objective lens. This effect is produced by the astigmatism in the beams.

The focus error signal is produced by $(A+C)-(B+D)$. The signal expressing the value of a data point on the information medium is obtained from summing the signals A, B, C, and D. FIG. 14B shows also overlapping beams 176, 178, 180 and 182 at the split detectors 172 and 174. These overlapping beams are produced by the diffraction effects of the grooved structure of the information medium. The tracking information can be derived from these overlapping beam. Just like the tracking error signal discussed previously with reference to FIG. 36, a tracking error signal can be derived from G−H or E−F.

Preferably, in the present invention, a differential method is used to obtain more stable tracking error signals from the pair of split detectors. To use this method, the laser pen shown in FIG. 8 is slightly rotated about an axis extending to the medium so that the phase of the tracking error signal G−H is 180 degrees out of phase with respect to the tracking error signal E−F. That is, when one side beam is centered on a land area, the other side beam will be centered on a track and the middle beam will be bisected. With this adjustment the differential tracking error signal according to this present invention is given by (G−H)−(E−F) or alternatively written as (G+F)−(H+E). This differential tracking signal eliminates any dc imbalance on the split detectors 172 and 174 caused by the scattered light within the housing of the laser pen. Moreover, it makes the tracking error signal very stable with respect to the movement of the objective lens 118 relative to the collimating lens 116.

In the first embodiment depicted in FIG. 8, the hologram lens and the grating are recorded on the opposite surfaces of the glass plate. However, it is also possible to multiplex the hologram lens and the grating together on the same surface. This simplifies the fabrication of the glass plate. However, multiplexing hologram lens and the regular grating together reduces the amount of light reaching the detector and at the same time introduces spurious images on the photodetector.

FIGS. 15A-D show alternative holographic lens assemblies 113 where the grating structure 120 and the holographic lens structure 122 are recorded on separated transparent plates 190 and 192. At least one of the transparent plates is oblique with respect to forward beam path 106. The transparent plates are preferably separated by an air gap 194.

Figure 15A:
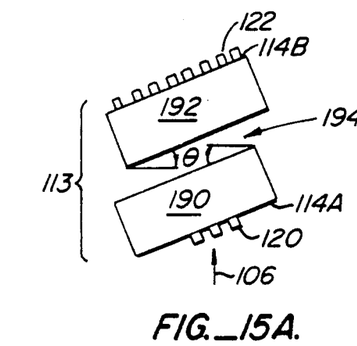
FIGS. 15A-D are diagrams of alternative holograph lens assemblies.
Figure 15B:
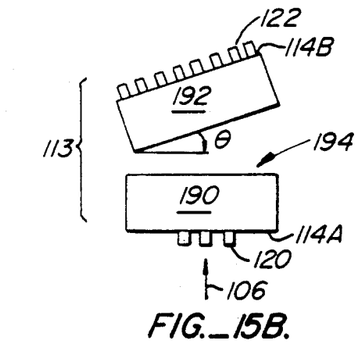
Figure 15C:
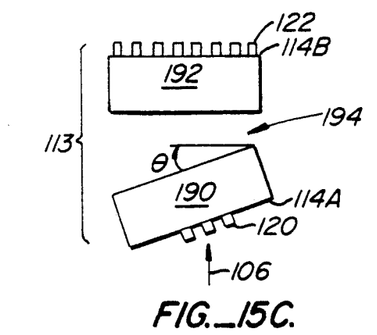
Figure 15D:
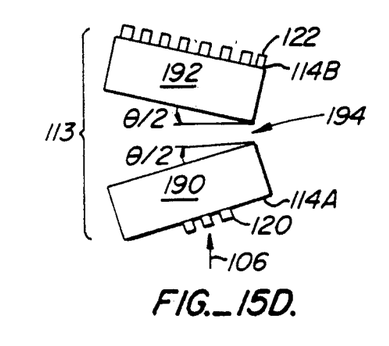

In FIGS. 15A, 15C and 15D, the diffraction grating is oblique with respect to the forward beam or optical axis. As a result, the diffracted beams from the grating will be distorted by a small amount of astigmatism and coma. In FIGS. 15A and 15C, the holographic assemblies will cause the laser beam to deviate from the optical axis, thereby requiring the optical head to be aligned. The optical head can be aligned during assembly by adjusting the position of the semiconductor laser and photodetector assembly. The hologram lens and the diffraction grating shown in FIG. 15D are tilted in opposite directions with respect to the forward beam. As a result, the laser beam is distorted slightly but is not offset from the optical axis. In FIG. 15B, the diffraction grating is perpendicular to the optical axis and does not cause distortion of the diffracted beams, but the tilted hologram lens causes the hologram lens to be offset.

Figure 16:
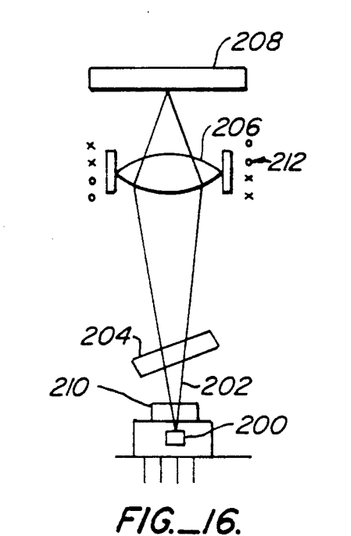
FIG. 16 is a diagram of a second embodiment of the present invention.

FIG. 16 shows a second embodiment of an optical head according to the present invention in which the collimating lens has been eliminated. A semiconductor laser 200 emits a laser beam 202 which passes through a holographic lens assembly 204 and an objective lens 206. The laser source is imaged by objective lens 206 onto an information medium 208. On the return path, the reflected beam has one of its first order diffraction beams imaged on a photodetector 210. An actuator 212 is used to move objective lens 206 in response to focus and tracking error signals. This embodiment represents a trade-off between the modularity of the first embodiment shown in FIG. 8 and the elimination of the collimating lens.

Figure 17:
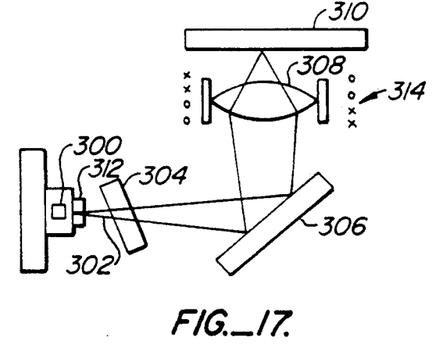
FIG. 17 is a diagram of an optical head according to the present invention utilizing an angled mirror.

FIG. 17 shows a third embodiment of an optical head according to the present invention in which a turning mirror is used to reduce the overall height of the optical head. A laser diode 300 produces a laser beam 302 which passes through a holographic lens assembly 304, is reflected by a turning mirror 306, and is focused by an objective lens 308 onto an information medium 310. On the return path, the reflected beam has one of its first order diffraction beams imaged on a photodetector 312. An actuator 314 is used to move objective lens 308 in response to focus and tracking error signals. This embodiment represents a trade-off between the height of the optical head and the addition of a turning mirror.

As will be understood by those familiar with the art, the present invention may be embodied in order specific forms without departing from the spirit or essential characteristics thereof. For example, the grating structure could be eliminated from the hologram lens assembly, thereby providing a single beam system. For another example, instead of etching, other methods such as embossing or photocopying could be used to record the holographic lens structures, including the grating structure, onto a transparent material such as glass, quartz or plastic. The eight segment detector can be internally connected to reduce the number of pins used in the laser diode and detector device. Accordingly, the disclosure of the preferred embodiments of the invention is intended to be illustrative, but not limiting, of the scope of the invention which is set forth in the following claims.

What is claimed is:

1. An optical head for reading information recorded on a reflective medium, comprising:
  a) a semiconductor laser for emitting a laser beam that travels along a forward beam path to the reflective medium, reflects off the reflective medium, and continues along a return beam path;
  b) a photodetector disposed along the return beam path for detecting the laser beam after the laser beam has reflected off the reflective medium; and
  c) a holographic lens assembly disposed along the forward and return beam paths, the assembly including:
    (i) a transparent plate positioned oblique to the beam paths, the transparent plate having a first and second surfaces; and
    (ii) a hologram lens structure;
  whereby the transparent plate corrects beam aberrations in the laser beam on the forward beam path, the hologram lens diffracts the laser beam onto the photodetector on the return beam path, and both the transparent plate and the holographic lens add beam aberrations to the diffracted laser beam on the return beam path.

2. The optical head of claim 1 wherein the transparent plate is comprised of glass.

3. The optical head of claim 1 wherein the holographic lens assembly further includes a second transparent plate with a surface having the holographic lens structure being disposed on the surface of the second transparent plate.

4. The optical head of claim 1 wherein the beam aberrations corrected in the laser beam include astigmatism.

5. The optical head of claim 1 wherein the beam aberrations added to the laser beam include astigmatism.

6. The optical head of claim 1 wherein the photodetector is a quadrant photodetector.

7. The optical head of claim 1 wherein the hologram lens assembly further includes a diffraction grating.

8. The optical head of claim 7 wherein the photodetector is an eight segment photodetector.

9. The optical head of claim 1 further comprising an objective lens for focusing the laser beam onto the medium.

10. The optical head of claim 9 further comprising a mirror for reflecting the laser beam from the semiconductor laser to the objective lens on the forward beam path and from the reflective medium to the photodetector on the return beam path.

11. An optical head for reading information recorded on a reflective medium, comprising:
   a) a semiconductor laser for emitting a laser beam that travels along a forward beam path to the reflective medium, reflects off the reflective medium, and continues along a return beam path;
   b) a photodetector disposed along the return beam path for detecting the laser beam after the laser beam has reflected off the reflective medium; and
   c) a holographic lens assembly disposed along the forward and return beam paths, the assembly including:
      (i) a transparent plate positioned oblique to the beam paths, the transparent plate having a first and second surfaces;
      (ii) a first hologram lens structure for diffracting the laser beam into a plurality of beams; and
      (iii) a second hologram lens structure for diffracting the laser beam into a plurality of beams;
   whereby the first hologram lens structure diffracts the laser beam into a plurality of beams on the forward beam path, the transparent plate corrects beam aberrations in the laser beam on the forward beam path, the second hologram lens structure diffracts the laser beam onto the photodetector on the return beam path, and both the transparent plate and the second holographic lens structure add beam aberrations to the diffracted laser beam on the return beam path.

12. The optical head of claim 11 wherein the first hologram lens structure is a diffraction grating structure.

13. The optical head of claim 12 wherein the second holographic lens structure is positioned relative to the diffraction grating structure diffracting the laser beam on the return beam path around the diffraction grating onto the photodetector.

14. The optical head of claim 12 wherein the transparent plate is comprised of glass.

15. The optical head of claim 12 wherein the holographic lens assembly further includes a second transparent plate having a surface, the second holographic lens assembly being disposed on the surface of the second transparent plate.

16. The optical head of claim 15 wherein the transparent plates are parallel to each other.

17. The optical head of claim 15 wherein the transparent plates are not parallel to each other.

18. The optical head of claim 12 wherein the beam aberrations corrected in the laser beam include astigmatism.

19. The optical head of claim 12 wherein the beam aberrations added to the laser beam include astigmatism.

20. The optical head of claim 12 wherein the photodetector is an eight segment photodetector.

21. The optical head of claim 12 further comprising an objective lens for focusing the laser beam onto the medium.

22. The optical head of claim 21 further comprising a mirror for reflecting the laser beam from the semiconductor laser to the objective lens on the forward beam path and from the reflective medium to the photodetector on the return beam path.

* * * * *